United States Patent [19]

Miericke et al.

[11] 3,927,735

[45] Dec. 23, 1975

[54] MAGNET SYSTEM FOR USE IN THE CONTACTLESS GUIDANCE OF A MOVING VEHICLE

[75] Inventors: Jurgen Miericke, Nurnberg; Laxmikant Urankar, Erlangen, both of Germany

[73] Assignee: Siemens Aktiengesellschaft, Munich, Germany

[22] Filed: Oct. 24, 1974

[21] Appl. No.: 517,590

[30] Foreign Application Priority Data

Nov. 7, 1973  Germany............................ 2355697

[52] U.S. Cl. ............................ 104/148 MS; 308/10
[51] Int. Cl.² ........................................ B61B 13/08
[58] Field of Search. 104/148 MS, 148 LM, 148 SS; 318/135; 310/12, 13; 308/10

[56] References Cited
UNITED STATES PATENTS

| | | | |
|---|---|---|---|
| 3,158,765 | 11/1964 | Polgreen | 104/148 MS |
| 3,470,828 | 10/1969 | Powell | 104/148 SS |
| 3,717,103 | 2/1973 | Guderjahn | 104/148 SS |

Primary Examiner—M. Henson Wood, Jr.
Assistant Examiner—Reinhard J. Eisenzopf
Attorney, Agent, or Firm—Kenyon & Kenyon Reilly Carr & Chapin

[57] ABSTRACT

A magnet system for the contactless guidance of a vehicle moving along a track with a plurality of individual magnets on the vehicle disposed one behind the other in the travel direction in which individual magnets of approximately round cross section with several individual magnets disposed one behind the other and having the same current direction are formed into magnet units the magnetic field of which corresponds approximately to that of a single rectangular magnet providing a magnet system which is easy to construct and operationally safe.

6 Claims, 6 Drawing Figures

MAGNET SYSTEM FOR USE IN THE CONTACTLESS GUIDANCE OF A MOVING VEHICLE

BACKGROUND OF THE INVENTION

This invention relates to a magnet system for the contactless guidance of a vehicle moving along a track in general and more particularly to an improved magnet system in which plurality of magnets of approximately round cross section are disposed one behind each other to form magnet units having a magnetic field approximately that of a single elongated rectangular magnet.

Two different guidance principles are known in the art for the contactless, magnetic support and guidance of vehicles, in particular vehicles which are intended to reach speeds in excess of 300 km/h. One of these is referred to as the "electromagnetic" guidance system in which the attractive forces between electromagnets disposed on both sides of the vehicle and ferromagnetic rails on the railroad line are used to generate lifting and/or guidance forces. In such a system the energization of the electromagnets must be controllable so that the spacing of the magnets from the rails can be maintained approximately constant.

The other type of system referred to as the "electrodynamic" guidance system instead uses repulsive magnetic forces generated by the eddy currents induced when the magnets are moved across highly conductive but nonmagnetic plates. Because the field strength of these, generally uncontrolled, electromagnets must be much higher than that of the electromagnets in a electromagnetic guidance system, it is advantageous to use superconducting magnets. This is particularly true since their weight is also comparatively lower than that of corresponding normally conducting magnets.

Various embodiments of electrodynamic suspension guidance arrangements are known typical of which is that disclosed in U.S. Pat. No. 3,470,828. An arrangement such as this comprises several vehicle loops respectively disposed on both sides of the vehicle one behind the other in the travel direction which interact with corresponding rail loops. The individual vehicle loops are elongated and of approximately rectangular design to make it possible to bring two vehicle loops in series close together one behind the other. Superconducting magnets with rectangular coil forms or coil forms only slightly rounded at their end faces and elongated in the travel directions serve as vehicle loops (see U.S. Pat. No. 3,717,103). For, as is obvious from the theory of electrodynamic suspension above a conductive plate, the ratio of the lifting force present to the breaking force in such a system becomes particularly favorable for elongated magnets when operating at speeds such as 500 km/h.

In contrast thereto small magnets cause a strong skin effect resulting in the crowding of the currents required in the conducting rail plates for lifting forces, developed by the small magnets, from the plate interior to the plate surface producing greater braking losses.

However, elongated, rectangular superconducting magnets such as magnets of lengths greater than 4 meters are difficult to manufacture with respect to winding technology. Furthermore their long conductor lengths generally require several connection points in each winding because production techniques set limits as to the lengths of individual conductors. Transition to the normal conducting state at one of these contact points can be prevented only at relatively high cost. Moreover, great expanding forces occur between the longitudinal conductors of the rectangular magnets which must be accounted for using separate and additional mean for support. With low temperatures such as those present where superconducting coils are involved, one end of such a supporting device which is required will then be at low temperature while the other end will be at ambient temperature. As a result sizable amounts of heat can flow through the supporting devices into the cooling medium thereby causing coolant evaporation losses, particularly where helium is used.

Due to the approximately rectangular shape of the magnets which are cooled to low temperatures, coolant tanks must also be of box shape. A radiation shield which is possibly required and the outer vacuum vessel must then generally have a cross section which is generally the same as the magnets. However, such box-shaped cryostats are generally made up of a plurality of individual components. As a result they have numerous welding seams and must have dimensions such that the vacuum forces present, or the compressive forces which can occur in case of malfunction of the magnets, and which forces act on their walls, will not result in their destruction. In addition many welding seams presents weak points which can affect both the mechanical stability and vacuum tightness. In addition the known elongated rectangular magnets constitute a risk for sake suspension operating in case of failure. It will be noted that even if one rectangular magnet fails the carrying capacity of the suspension system is greatly impaired. In adition such magnets are difficult to replace and repair and repair costs are high in case of damage.

In view of this it is the object of the present invention to provide a magnet system which eliminates or at least reduces the above noted difficulties.

SUMMARY OF THE INVENTION

The present invention solves this problem in a magnet system comprising several individual magnets connected to the vehicle and disposed one behind the other in the vehicle through the provision that the individual magnets are of approximately round cross section and that groups of several individual magnets having the same direction of current are disposed one behind the other and combined to form magnet units having a magnetic field corresponding approximately to that of a single elongated rectangular magnet. This arrangement offers numerous advantages. Small round individual magnets are easy to wind on the one hand and on the other hand the use of many small magnets electrically independent of each other assures reliable suspension guidance, even if several magnets fail, since the loss of lifting power within the entire magnet system is still relatively small. In addition it is also simpler and cheaper to repair or replace smaller individual magnets than to replace larger rectangular magnets. In particular when superconducting magnets are used as individual magnets the internal coil forces due to the inherent current can be absorbed by the conductor material as tensile stress and need not be transmitted through separate supporting device. This in turn permits the heat introduction losses into the coolant cooking the superconducting magnets to be reduced.

It is possible according to a further embodiment of the invention for the individual magnets to be disposed in approximately cylindrical cryostats thereby permitting their required coolant tanks and vacuum housings to also be of cylindrical shape. As a result they have greater stiffness than box shapes and can be designed with thinner walls than is possible in the latter. Furthermore, they can be produced more easily at a lower cost. In addition, they have fewer welding seems than the box shaped cryostat resulting in an initially higher potential for maintaining vacuum tightness.

BRIEF DESCRIPTION OF THE DRAWINGS

FIG. 2b illustrates the total resultant current and fields obtained from an arrangement such as that of FIG. 2a.

DETAILED DESCRIPTION OF THE PREFERRED EMBODIMENT

Figure 1:
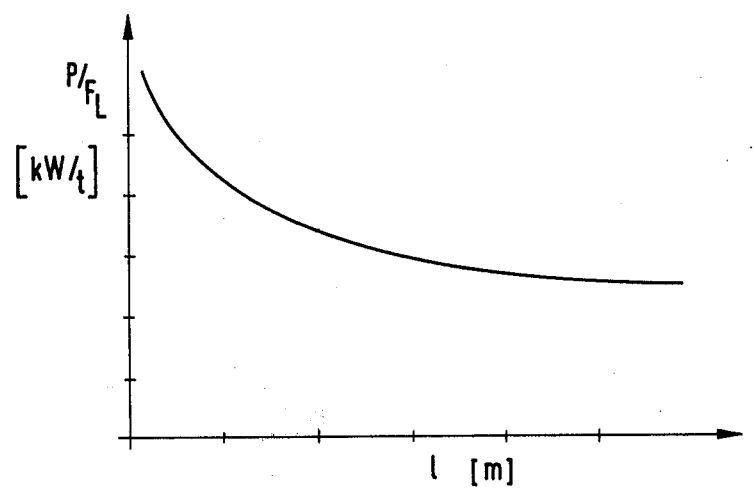
FIG. 1 is a curve illustrating the relationship between magnet length and braking loses.
Figure 2A:
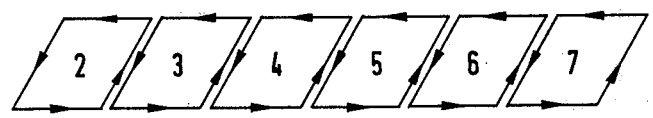
FIG. 2a is a perspective schematic view of a plurality of small rectangular magnets showing current directions and current loops.
Figure 2B:
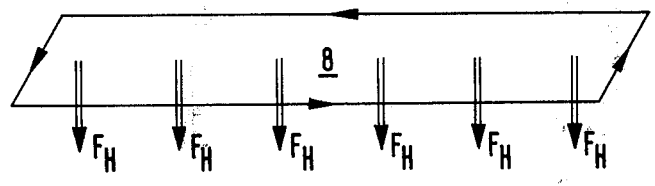

FIG. 1 illustrates a relationship between the length 1 of a lifting magnet in the travel direction and the specific braking losses $P/F_L$, i.e., the braking losses P per lifting force $F_L$. As shown, the braking losses decrease with an increasing length 1 of the lifting magnet in the travel direction. The braking losses P therein represent the product of braking force and vehicle speed. From this it follows that the longest possible lifting magnets are required in order to limit or reduce braking losses. Typically such lifting magnets can be of rectangular shape and can be composed of a plurality of individual magnets in a known manner. FIG. 2a illustrates the current loops of the coils and the current directions for six such individual magnets disposed one behind the other in the travel direction. Each of the individual magnets 2 through 7 is energized in the same sense. At the mutually facing faces of each two individual magnets the magnetic field produced by the currents essentially cancel each other out due to the currents flowing in the opposite direction. As a result only the current loop enveloping all of the individual magnets 2 through 7 contributes to the generation of a magnetic field. This illustrated by FIG. 2b which also illustrates, by the double arrows $F_H$, the fields one for each current loop, in the overall single magnet unit 8 covering the area of the individual magnets 2 through 7.

Figure 3A:
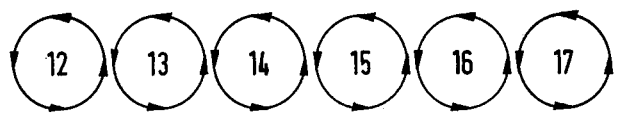
FIG. 3a is a diagram corresponding to that of FIG. 2a for circular magnets.
Figure 3B:
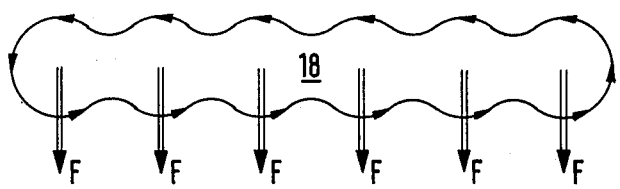
FIG. 3b is a diagram similar to that of FIG. 2b illustrating the resultant total current and forces.

In the arrangement of FIG. 3a six individual magnets 12 to 17 preferably having approximately circular cross sectional area are shown. These individual magnets 12 to 17 are similarly energized in the same sense and, as illustrated by FIG. 3b, represent an elongated magnet unit 18. In essence this magnet unit 18 correspond to the magnet unit 8 of FIG. 2b. Accordingly the magnetic field produced by it and indicated on the Figure by the double arrows F corresponds approximately to the magnetic field $F_H$ of the magnet unit 8 of FIG. 2b.

Figure 4:
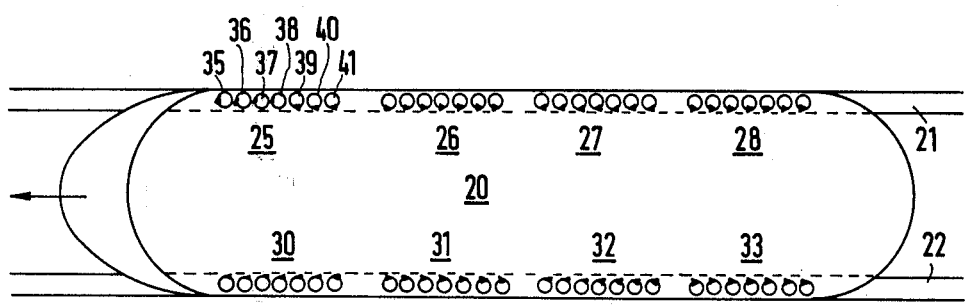
FIG. 4 is a schematic plan view of a horizontal section of a vehicle having a plurality of magnets according to the present invention.

FIG. 4 illustrates a vehicle 20 guided using the electrodynamic guidance principle described above. It is suspended above a rail line having rails or conductor plates 21 and 22. In order to generate the required lifting forces, disposed along each long side of the vehicle are four magnet units designated 25 through 28 and 30 through 33 respectively. These are rigidly joined to the vehicle. Each magnet unit comprise, for example, seven individual magnets 35 through 41 disposed one behind the other in the travel direction. Only the individual magnets assigned to the magnet unit 25 have their reference symbols shown on the Figure. These individual magnets 35 to 41 are energized in the same sense, are of approximately the same size, and preferably of round cross section as described above in connection with FIG. 3a. Each group of seven individual magnets form one magnet unit which can be typically approximately 2 meters in length. The magnet units 25 to 28 and 30 to 33 disposed on opposite sides of the vehicle 20 alternate in their current direction. Small arrows on the individual magnets of the magnet units indicate the current direction. A large magnetic field gradient, resulting in correspondingly great lifting forces, is obtained between each two adjacent units by the alternating polarity of the magnet units 25 to 28 and 30 to 33 which is thus produced.

It should be noted that the magnet system described may be used not only for the generation of lifting forces in electrodynamic systems but also in side stabilizing guidance forces through appropriate arrangements of such magnet systems on a vehicle. In addition the suspension and lateral guidance of a vehicle can also be accomplished using the electromagnetic principle employing appropriate magnet systems according to the present invention having individual magnets which are controllable or are permanent magnets in part and have circular cross sections. These and other modifications may be made without departing from the spirit of the invention which is intended to be limited solely by the appended claims.

What is claimed is:

1. A magnet system for the contactless guidance of a vehicle moving along a track, comprising a plurality of individual magnets connected to the vehicle and disposed one behind the other in the travel direction, wherein the improvement comprises a plurality of individual magnets each of which is approximately of circular cross-section with the total plurality of magnets divided into groups, with all individual magnets in a group disposed one behind the other and having the same current direction such that each group forms a magnet unit having a magnetic field corresponding approximately to that of a single, elongated rectangular magnet.

2. A magnet system according to claim 1 wherein each of said plurality of individual magnets is a superconducting magnet.

3. A magnet system according to claim 2 wherein said individual magnets are disposed within approximately cylindrical cryostats and are cooled by helium.

4. A magnet system according to claim 1 for use in an electrodynamic guidance system wherein the polarity of each two adjacent magnet units disposed one behind the other in the travel direction is opposite.

5. A magnet system according to claim 4 wherein each of said plurality of individual magnets is a superconducting magnet.

6. A magnet system according to claim 5 wherein said individual magnets are disposed within approximately cylindrical cryostats and are cooled by helium.

* * * * *